McVutt & Furman
Plow.
No. 95,251. Patented Sep. 28, 1869.
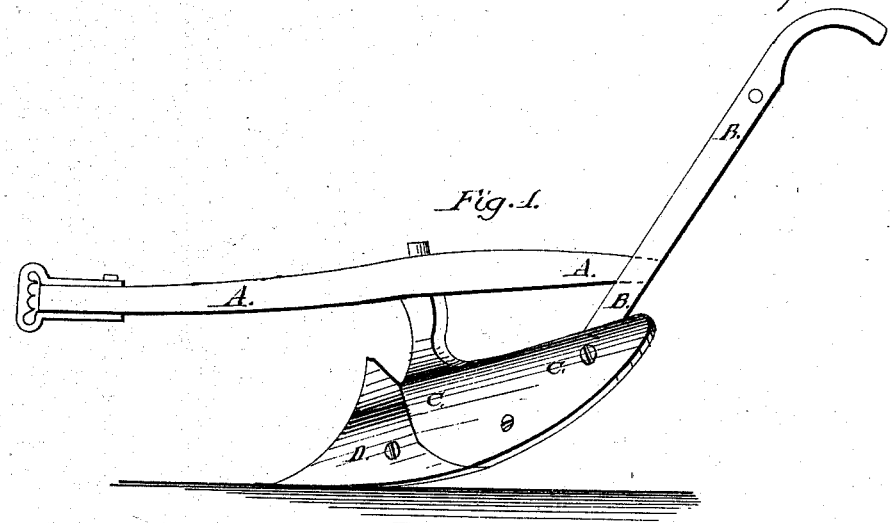
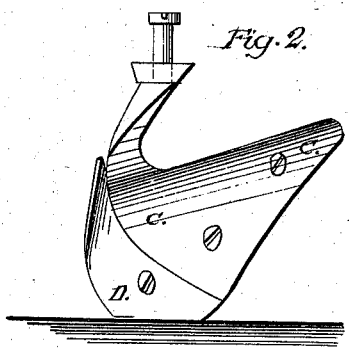
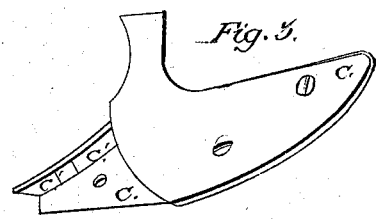
Witnesses:
Geo. W. Mabee
[signature]
Inventor:
J. C. McVutt &
A. B. Furman
By Munn & Co.
atty's.

UNITED STATES PATENT OFFICE.

J. C. McVUTT AND A. B. FURMAN, OF STRATTONVILLE, PENNSYLVANIA.

IMPROVEMENT IN PLOWS.

Specification forming part of Letters Patent No. 95,251, dated September 28, 1869.

*To all whom it may concern:*

Be it known that we, J. C. McVUTT and A. B. FURMAN, of Strattonville, in the county of Clarion and State of Pennsylvania, have invented a new and useful Improvement in Plows; and we do hereby declare that the following is a full, clear, and exact description thereof, which will enable others skilled in the art to make and use the same, reference being had to the accompanying drawings, forming part of this specification, in which—

Figure 1 is a side view of our improved plow. Fig. 2 is a front view of the same. Fig. 3 is a detail side view of the mold-board part of the plane.

Similar letters of reference indicate corresponding parts.

Our invention has for its object to furnish an improved plow; and the improvement consists in the construction of the mold-board, as will be hereinafter fully set forth; and it consists in the construction of various parts of the plow, as hereinafter more fully described.

A represents the beam, and B the handle, of the plow.

C is the mold-board, which is secured to the beam and handles in the ordinary manner. The landside is made with a shoe or false landside, so that it may be conveniently replaced with a new one when worn.

D is the point, which fits into a seat formed for its reception upon the mold-board and landside in the ordinary manner. The landside and the colter or cutting-edge of the point, landside, and mold-board are formed upon an incline, as shown in Fig. 2, so as to cut the land side of the furrow upon an incline. By this construction, as the furrow-slice is cut and raised by the plow it rests upon its inner edge, so that it will overbalance even before it reaches a perpendicular position, thus making the draft lighter than with plows constructed in the ordinary manner. This construction of the plow also causes the furrow-slice, when turned, to overlap the preceding furrow-slice, leaving an air passage or channel along the under side of each furrow-slice, causing the sod to rot more quickly and making the harrowing more effective in pulverizing the ground.

Near the upper edge of the part of the mold-board C that is covered by the point D is formed a groove, $c'$, to receive a steel bar, the forward end of which is designed to project to serve as a point in plowing hard or gravelly soil. The groove $c'$ should be formed with one or more ribs to enter a recess or recesses in said bar to prevent longitudinal movement. In this case the point B should project no farther than the forward end of the mold-board C.

Having thus described our invention, what we claim as new, and desire to secure by Letters Patent, is—

Forming a groove, $c'$, in the part of the mold-board that is covered with the plow-point, substantially as herein shown and described, and for the purpose set forth.

J. C. McVUTT.
      A. B. FURMAN.

Witnesses:
 J. R. FULTON,
 E. W. EVERDING.